(12) United States Patent
Ahlberg

(10) Patent No.: US 6,647,867 B2
(45) Date of Patent: Nov. 18, 2003

(54) PASTEURIZER

(75) Inventor: Peter Ahlberg, Alsgarde (DK)

(73) Assignee: Sander Hansen A/S, Brondby (DK)

( * ) Notice: Subject to any disclaimer, the term of this patent is extended or adjusted under 35 U.S.C. 154(b) by 0 days.

(21) Appl. No.: 10/394,817

(22) Filed: Mar. 21, 2003

(65) Prior Publication Data

US 2003/0183087 A1 Oct. 2, 2003

(30) Foreign Application Priority Data

Mar. 28, 2002 (EP) .......................................... 02007424

(51) Int. Cl.$^7$ .............................. A23L 1/00; A23L 3/00; A23L 3/04; A47J 27/00; A47J 27/08
(52) U.S. Cl. ............................. 99/360; 99/361; 99/352; 99/443 C; 99/453; 99/467; 99/470; 99/483; 198/430; 198/447; 422/298; 422/304
(58) Field of Search ................... 99/352–355, 359–365, 99/443 C, 443 R, 427, 386, 467–470, 477–479, 452, 453, 451, 483; 422/298, 304, 302, 25, 28, 31, 64; 198/803.15, 803.01, 635, 325, 430, 436, 447, 427, 779; 53/167, 221, 426, 282, 425; 426/521, 407

(56) References Cited

U.S. PATENT DOCUMENTS

| | | | | |
|---|---|---|---|---|
| 2,237,345 A | * | 4/1941 | Frentzel, Jr. et al. | 198/600 |
| 2,596,404 A | | 5/1952 | Holbeck | |
| 2,953,234 A | | 9/1960 | Abendschein | |
| 3,610,394 A | * | 10/1971 | Sager | 198/866 |
| 4,346,650 A | * | 8/1982 | Zaitsu | 99/361 |
| 4,646,629 A | * | 3/1987 | Creed et al. | 99/468 |
| 4,807,421 A | * | 2/1989 | Araki et al. | 53/167 |
| 4,992,247 A | * | 2/1991 | Foti | 422/304 |
| 5,012,727 A | * | 5/1991 | Pesente | 99/470 |
| 5,551,334 A | * | 9/1996 | Cody | 99/470 |
| 5,750,174 A | * | 5/1998 | Lucassen | 426/521 |
| 5,993,886 A | * | 11/1999 | Polster | 426/614 |
| 6,024,917 A | * | 2/2000 | Kamstra | 422/33 |
| 6,296,110 B1 | * | 10/2001 | Van Zjderveld et al. | 198/635 |
| 6,393,977 B1 | * | 5/2002 | Voisin | 99/467 |

FOREIGN PATENT DOCUMENTS

| | | |
|---|---|---|
| DE | 2508275 | 9/1976 |
| DE | 2633384 | 1/1978 |

* cited by examiner

Primary Examiner—Timothy F. Simone
(74) Attorney, Agent, or Firm—Marshall, Gerstein & Borun LLP

(57) ABSTRACT

A pasteurizer (1) comprising an endless circulating transport conveyor (3) guided around deflection rolls (7, 8) and used for transporting through the pasteurizer (1) the products (18) to be pasteurized, and having a feed conveyor (5) and/or a discharge conveyor (9) oriented essentially transversely to the conveying direction of the transport conveyor (3) and having a smaller width than the transport conveyor (3), feed conveyor (5) and/or discharge conveyor to and away from the respective end face of the transport conveyor (3), and a transfer surface (4, 19) for bridging a distance between the conveying surface(s) of the feed conveyor (5) and/or of the discharge conveyor (9) and the conveying surface of the transport conveyor (3). The feed conveyor (5) and/or the discharge conveyor (9) is arranged so close to the respective end face of the transport conveyor (3) that the lateral boundary (K) thereof, which face the transport conveyor (3), is arranged above the contour of the respective deflection roll (7, 8).

14 Claims, 2 Drawing Sheets

PASTEURIZER

Figure 1:
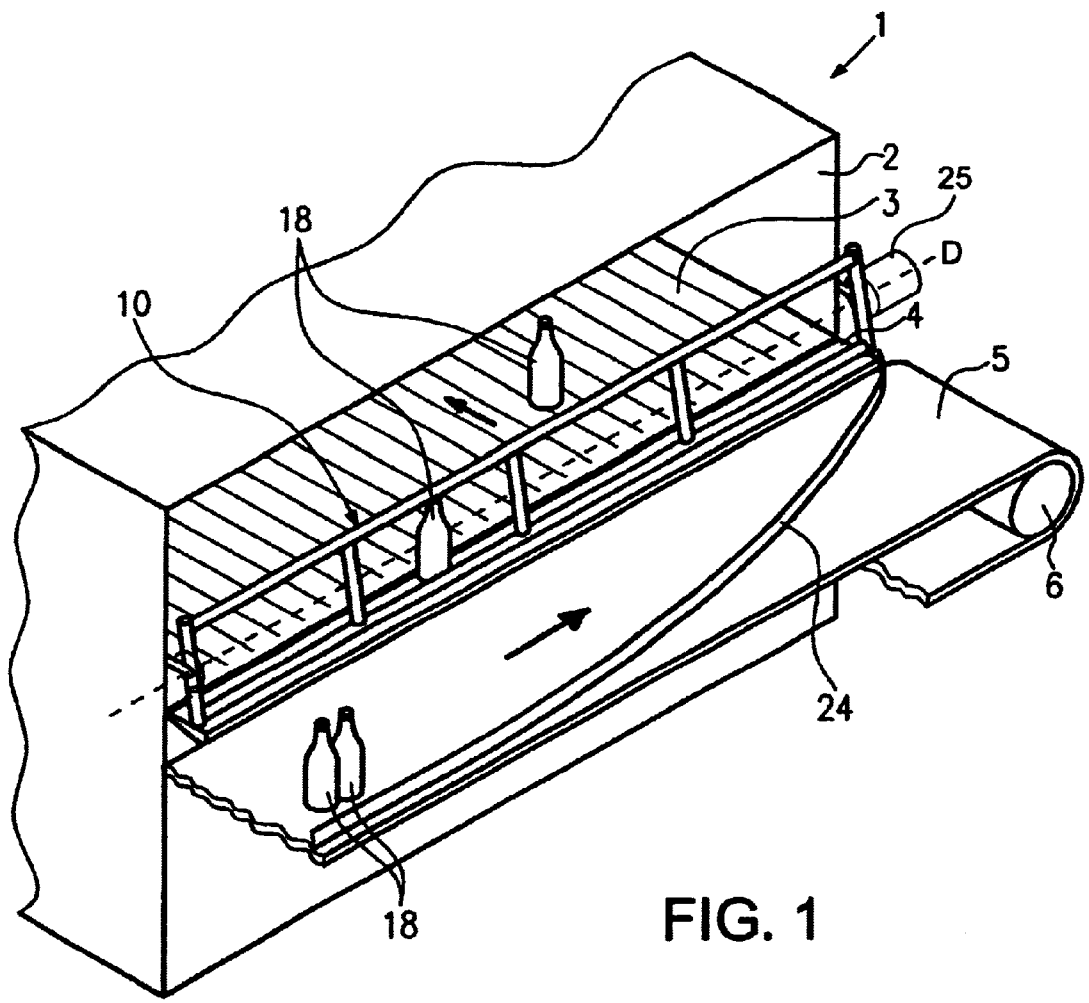

FIELD OF THE INVENTION
BACKGROUND OF THE INVENTION

The present invention relates to a pasteurizer according to the generic clause of claim 1.

Pasteurizers of this kind are used, e.g. in the food-processing industry, for pasteurizing products, such as filled and sealed glass bottles.

For this purpose, the product is slowly passed through a tunnel on a transport conveyor, which normally has a width of several meters; in the tunnel the product is heated and then cooled down.

The products are normally fed to the pasteurizer on a fast-running feed conveyor, which has a markedly narrower width than the slower transport conveyor, and, after having been pasteurized, they are discharged by a fast-running discharge conveyor.

A pasteurizer of the type in question is known from DE2633384. The feed conveyor and the transport conveyor have provided between them a transfer surface implemented in the form of a sheet-metal plate or the like, so that the products can be pushed by means of a linear pusher from the feed conveyor across the plate onto the transport conveyor of the pasteurizer.

Whereas in DE2633384 only one row of products is supplied at a time, solutions are also known in the case of which the products are supplied on the feed conveyor in several rows side by side, the preceding bottles being pushed into the pasteurizer by said rows of bottles so that a pusher can be dispensed with.

These pasteurizers proved to be disadvantageous insofar as, if the supply of bottles is discontinued, e.g. for the purpose of affecting a change of product, products may remain on the plate between the feed conveyor and the transport conveyor, which must then be pushed by hand or which necessitates once more the use of a pusher for pushing them over the plate.

The plate has normally a width of more than half a meter so as to bridge the strurally conditioned gap between the feed conveyor and the transport conveyor of the pasteurizer.

In addition, DE 2508275 discloses a right-angled arrangement of single-track or multiple-track apron conveyors which are arranged on the same level. In this kind of arrangement, bottles or cans are transported from one apron conveyor onto the next, the second apron conveyor being arranged at right angles to the first one. In contrast to the transport conveyor of a pasteurizer and the feed conveyor thereof, both conveyors have the same width. In addition, they are also operated at the same speed, whereby a good transfer is obtained automatically, without any risk of falling over of the bottles or cans due to deceleration. In order to move the bottles or cans from one apron conveyor onto the next, a strip is arranged on the structure of the apron-type feed conveyor; by means of this strip bottles or cans can be transferred across the gap between the two conveyors. On the bottom side of the feed conveyor a cavity is formed in which a part of the deflection roll of the discharge conveyor is accommodated. The strip has a width corresponding to approximately less than half the diameter of a bottle to be transported. A pusher can be dipsensed with in this case.

SUMMARY OF THE INVENTION

It is the object of the present invention to provide a pasteurizer that can comprise a transport conveyor which is at least several times as broad as a feed conveyor and which moves at a much lower speed than the feed conveyor, but which still permits a trouble-free transfer of products even if only a small number of products or, temporarily, no products at all arrive, e.g. when a change of products takes place.

The characteristic features of the pasteurizer according to the present invention are that due to the arrangement of the feed conveyor and of the discharge conveyor, respectively, the transfer surface can be kept so short that, when a change of products takes place, no products or, if at all, only a small number of products will remain on said transfer surface.

A specially preferred embodiment is characterized in that a pusher is provided by means of which products remaining on the transfer surface, e.g. in the case of a change of products, can be pushed from the transfer surface onto the transport conveyor or onto the discharge conveyor. It will be of advantage, when this pusher is implemented as a rotary pusher. A rotary pusher operates, in comparison with a linear pusher, very reliably and it is less error-prone. Due to the fact that only one row of products is displaced over a pretty short distance, also a rotary pusher will be able to act on the products always at approximately the same height, provided that the pusher element, e.g. a rod, is applied in a circular segment located on a low level of the circular path of the rotary movement, since the pusher element will there vary only slightly in height during a rotary movement.

BRIEF DESCRIPTION OF THE INVENTION

Figure 2:
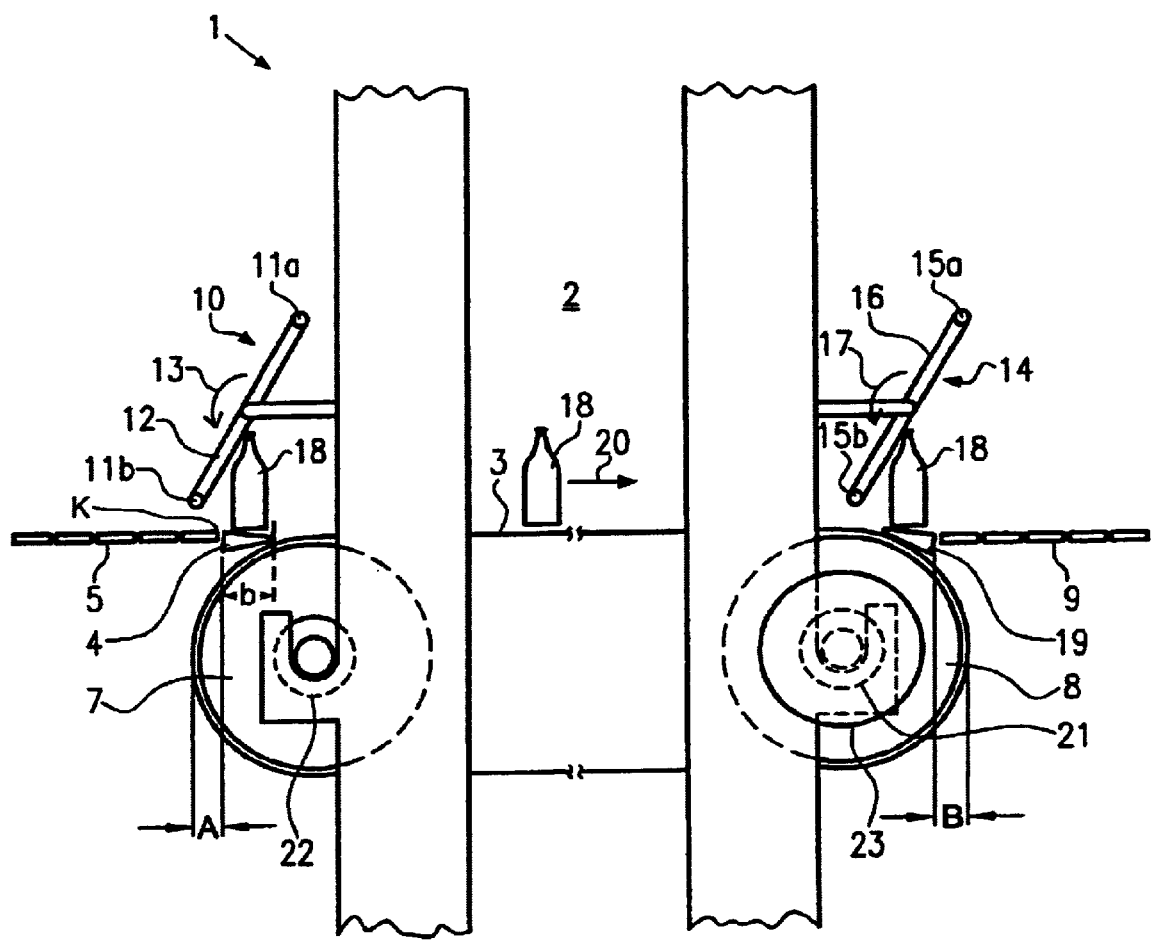

One embodiment of a pasteurizer according to the present invention is explained making reference to the figures enclosed, in which FIG. 1 shows a perspective view of a pasteurizer and FIG. 2 shows a schematic sectional drawing of a pasteurizer.

FIG. 1 shows a pasteurizer 1 with a tunnel 2 in which products 18 can be pasteurized. The products 18 which, as shown in FIG. 1, can e.g. be bottles, are transported through the Pasteur tunnel 2 on a transport conveyor 3 in an upright position.

DETAILED DESCRIPTION OF THE INVENTION

At the inlet of the pasteurizer 1, a feed conveyor 5 is arranged in front of the end face of the transport conveyor and at right angles thereto; in comparison with the transport conveyor 3 of the pasteurizer, this feed conveyor 5 is much narrower and, consequently, it must be operated at a markedly higher speed than the transport conveyor 3 of the pasteurizer 1. The feed conveyor 5, which is implemented e.g. as a conveyor belt, apron conveyor, etc., is able to feed the products 18 to the inlet of the pasteurizer 1. For this purpose, a rail 24 is arranged above the feed conveyor 5, said rail 24 supplying the incoming products 18 to the inlet of the pasteurizer 1.

Other than shown—for the sake of clarity—in the case of FIG. 1, the whole area of the feed conveyor 5 is normally filled with products 18 on the side of the rail 24 on which the pasteurizer 1 is located, when the pasteurizer 1 is in operation. This has the effect that the products 18 are pushed into the inlet of the pasteurizer 1 by the subsequent bottles.

The transport conveyor 3 and the feed conveyor 5 have provided between them a transfer surface 4 by means of which a small gap between the feed conveyor 5 and the transport conveyor 3 of the pasteurizer 1 is bridged.

Products 18 remaining on this transfer surface 4, if e.g. the supply of products 18 on the feed conveyor 5 ceases, can be pushed onto the transport conveyor 3 by means of the rotary pusher 10. In view of the fact that the transfer surface 4 is so short (the width b is preferably between 5 and 10 cm), it is possible to use a rotating pusher 10 acting on the products at an optimum height thereof so as to push them. Due to the fact that the products are acted upon at an optimum height, they are prevented from falling over.

FIG. 2 shows a sectional drawing of the pasteurizer 1. On the left-hand side in FIG. 2, the feed conveyor 5 can be seen. The transfer surface 4 is arranged side by side with the feed conveyor 5 and on the same level as the surface of said feed conveyor 5, said transfer surface 4 being designed such that it is slightly inclined in the direction of the pasteurizer 1.

The pasteurizer 1 comprises an endless circulating transport conveyor 3 which is guided around rolls 7, 8. The rolls 7, 8 are supported in bearings 21, 22 on the outer side of columns. On the right-hand side of FIG. 2, a transfer surface 19 is shown, which is slightly inclined outwards. Subsequent to the transfer surface 19, the discharge conveyor 9 is shown, which is implemented e.g. as a conveyor belt, apron conveyor, etc. and by means of which products 18 can be transported away from the pasteurizer 1.

Both the feed conveyor 5 and the discharge conveyor 9 convey products 18 perpendicularly to the plane of the drawing in FIG. 2.

The length of the stationary transfer surface 4 is so short in the conveying direction 20 of the transport conveyor 3 that the boundary of the feed conveyor 5 which constitutes the right boundary in FIG. 2, i.e. which faces the transport conveyor 3, is arranged such that it extends above the contour of the deflection roll 7. The right boundary projects by the amount A beyond the contour of the roll 7 in the direction of the transport conveyor 3; in other words, the width b of the transfer surface is smaller than the radius of the deflection rolls. Also the left boundary of the discharge conveyor 9, i.e. the boundary facing the transport conveyor 3, projects by the amount B beyond the contour of the roll 8 in the direction of the transport conveyor 3.

The transfer surfaces 4, 19, which are short in the conveying direction 20, are each able to accommodate approximately one row of products 18.

A respective rotary pusher 10,14 is arranged above the transfer surfaces 4, 19 so as to push the products 18 which may remain on the transfer surfaces 4, 19.

The transfer surfaces 4, 19 can be arranged such that they are slightly inclined so as to facilitate or permit a sliding movement of the bottles.

The statements made hereinbelow with regard to the feed pusher 10 apply correspondingly also to the discharge pusher 14.

The feed pusher 10 consists of two long, parallel rods 11a and 11bwhich are spaced apart by means of crossbars 12. In FIG. 2, t pusher 10 rotates about an axis located between the two parallel, long rods 11a and 11b. It is, however, also imaginable that the rotation takes place e.g. about the rod 11 a constituting the upper rod in FIG. 2, or about any other suitable axis of rotation.

it will be advantageous when the axis of rotation of the rotary pusher 10 extends centrally above the transfer surface 4, as shown in FIG. 2, but it may also extend closer to or farther away from the pasteurizer 1.

According to an advantageous embodiment, the rotary pusher 10 can be moved to a position of rest of such a nature that the two long, parallel rods 11a and 11b are located above the products 18 and will therefore not interfere with the free movement of said products 18 during normal operation. For this purpose, it will be of advantage when the center of rotation 13 is located above the path of the product 18. The center of rotation may, however, also be located in the area of the path of the products 18. This allows a compact structural design of the pusher 10 comprising crossbars 12 which are shorter than the height of a product 18. The pusher 10 may also be implemented such that it is vertically adjustable in its entirety.

Whereas two long, parallel rods 11a and 11b are provided in FIG. 2, it is also possible to provide only a single rod 11b for pushing the products 18. In this case, it will also be possible to use a pusher 10 having a compact structural design for displacing the rod 11b to a position above the path of the products 18, without the rod 11a, which does not exist in this embodiment, obstructing the products during normal operation. The pusher 10 will here carry out a 360° rotation per working stroke.

If two rods 11a, 11b are provided, they can be used alternately; in this case, the pusher will carry out a 180° rotation per working stroke.

Due to a rotary movement 13 of the rotary pusher 10, the rod 11b will act on the product 18, as shown in FIG. 2, and push it from the transfer surface 4 onto the transport conveyor 3.

Likewise, the discharge pusher 14 pushes a product 18 from the transfer surface 19 onto the discharge conveyor 9.

In the embodiment shown in FIG. 2, a drive means 23 is arranged on the axle of the roll 8; this drive means 23 can e.g. be a motor or a transmission. The drive means 23 is implemented such that it has a smaller diameter than the roll 8 so that the movement of the discharge conveyor 9 will not be obstructed.

The pushers 10, 14 can be adapted to be driven electromotively, e.g. by a geared motor 25, and/or by a servomotor and/or pneumatically and/or hydraulically.

Furthermore, the pushers can be set in motion by means of a trigger device. This trigger device can e.g. be a switch by means of which the operating personnel triggers the movement of the pusher so as to push the products on the transfer surface. It is also possible to provide a sensor by means of which the non-arrival of the subsequent bottles is detected and the movement is then triggered automatically. In this connection, e.g. a light barrier may be provided, which examines whether bottles arrive at the inlet of the pasteurizer or at the feed conveyor.

The trigger device may also receive a signal from a central production control by means of which the movement of the pusher is ordered.

What is claimed is:

1. A pasteurizer (1) comprising:
an endless circulating transport conveyor (3) guided around deflection rolls (7, 8) and used for transporting through the pasteurizer (1) the products (18) to be pasteurized, one of a feed conveyor (5) and a discharge conveyor (9) oriented essentially transversely to the conveying direction of the transport conveyor (3) and having a smaller width than the transport conveyor (3), said the one of the feed conveyor (5) and discharge conveyor (9) being used for transporting the products (18) to and away from the respective end face of the transport conveyor (3), and a transfer surface (4, 19) for bridging a distance between the conveying surface(s) of the one of the feed conveyor (5) and of the discharge conveyor (9) and the conveying surface of the transport conveyor (3), the one of the feed conveyor (5) and the discharge conveyor (9) being arranged so close to the respective end face of the transport conveyor (3) that the lateral boundary (K) thereof, which face the transport conveyor (3), is arranged above the contour of the respective deflection roll (7, 8).

2. A pasteurizer (1) according to claim 1, wherein when seen in the conveying direction (20) of the transport conveyor (3), the transfer surface (4, 19) has a width (b) which correspond approximately to a dimension of the product (18) in the conveying direction (20) of the transport conveyor (3).

3. A pasteurizer (1) according to claims 2, wherein when seen in the conveying direction (20) of the transport conveyor (3), the transfer surface (4, 19) has a width (b) in the range between approximately 20 cm and 2 cm.

4. A pasteurizer (1) according to claims 1, wherein the transfer surface (4, 19) is inclined slightly downwards in the conveying direction.

5. A pasteurizer (1) according to the claims 1, wherein one of a feed pusher (10) and a discharge pusher (14) is provided for pushing products (18) on the transfer surface (4, 19).

6. A pasteurizer (1) according to claim 5, wherein the one of the feed pusher (10) and the discharge pusher 14 is designed as a rotary pusher.

7. A pasteurizer (1) according to claim 6, wherein the rotary pusher (2) comprises at least one, parallel rod (11a, 11b, 15a, 15b), which is arranged essentially transversely to the conveying direction (20) of the transport conveyor (3) and which is adapted to be rotated about a substantially horizontal axis (D).

8. A pasteurizer (1) according to claim 7, wherein the at least one parallel rod (11a, 11b, 15a, 15b) is held by at least one crossbar (12, 16).

9. A pasteurizer according to claims 5, wherein the one of the feed pusher (10) and the discharge pusher (14) is adapted to be driven adapted by one of electromotively, a servomotor, pneumatically, and hydraulically.

10. A pasteurizer according to claims 5, and a trigger device is provided for triggering the movement of the one of the feed pusher (10) and the discharge pusher.

11. A pasteurizer according to claims 7, wherein the axis (D) extends centrally between the two parallel rods (11a, 11b, 15a, 15b).

12. A pasteurizer according to claim 3, wherein the transfer surface width (b) is in the range between approximately 15 cm and 3 cm.

13. A pasteurizer according to claim 12 wherein the transfer surface width (b) is in the range between approximately 10 cm and 5 cm.

14. A pasteurizer according to claim 7, wherein the rotary pusher (2) further comprises a second parallel rod.

* * * * *

UNITED STATES PATENT AND TRADEMARK OFFICE
CERTIFICATE OF CORRECTION

PATENT NO. : 6,647,867 B2
DATED : November 18, 2003
INVENTOR(S) : Peter Ahlberg

It is certified that error appears in the above-identified patent and that said Letters Patent is hereby corrected as shown below:

Column 2,
Line 7, please delete "feed" and insert -- the feed --

Column 5,
Line 11, please delete "claims 2" and insert -- claim 2 --
Lines 15 and 18, please delete "claims 1" and insert -- claim 1 --
Line 25, please delete "one, parallel" and insert -- one parallel --

Column 6,
Lines 7 and 11, please delete "claims 5" and insert -- claim 5 --
Line 14, please delete "claims 7" and insert -- claim 7 --

Signed and Sealed this

Thirty-first Day of May, 2005

JON W. DUDAS
*Director of the United States Patent and Trademark Office*